United States Patent
Meckenstock

(10) Patent No.: US 10,449,854 B2
(45) Date of Patent: Oct. 22, 2019

(54) MOUNTING UNIT COMPRISING DRIVE SHAFT AND DRIVE SHAFT HOLDER AS WELL AS MOTOR VEHICLE COMPRISING MOUNTING UNIT

(71) Applicant: Ford Global Technologies, LLC, Dearborn, MI (US)

(72) Inventor: Daniel Meckenstock, Wuppertal (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 457 days.

(21) Appl. No.: 15/410,434

(22) Filed: Jan. 19, 2017

(65) Prior Publication Data

US 2017/0203651 A1    Jul. 20, 2017

(30) Foreign Application Priority Data

Jan. 20, 2016    (DE) .................... 10 2016 200 741

(51) Int. Cl.
*B60K 17/24*    (2006.01)

(52) U.S. Cl.
CPC .......... *B60K 17/24* (2013.01); *B60Y 2306/01* (2013.01); *B60Y 2410/102* (2013.01)

(58) Field of Classification Search
CPC .... B60K 17/22; B60K 17/24; B60Y 2306/01; B60Y 2410/102
See application file for complete search history.

(56) References Cited

U.S. PATENT DOCUMENTS

| | | | |
|---|---|---|---|
| 6,371,859 B1 | 4/2002 | Gibson | |
| 6,570,894 B2 | 5/2003 | Anderson | |
| 8,157,658 B2 | 4/2012 | Langer et al. | |
| 8,186,641 B2 * | 5/2012 | Valovick | B60K 17/24 248/560 |
| 8,888,376 B2 * | 11/2014 | Hatogai | F16C 3/02 384/480 |
| 9,580,108 B2 | 2/2017 | Mentzel et al. | |
| 2003/0079327 A1 | 5/2003 | Durand | |
| 2016/0243935 A1 * | 8/2016 | Yun | B60K 17/24 |

FOREIGN PATENT DOCUMENTS

| | | |
|---|---|---|
| JP | 2002/002527 | 1/2002 |
| JP | 2002/012040 | 1/2002 |
| WO | 2011/101952 | 8/2011 |

* cited by examiner

*Primary Examiner* — Jonathan P Masinick
(74) *Attorney, Agent, or Firm* — Diederiks & Whitelaw, PLC

(57) ABSTRACT

A mounting unit for a motor vehicle, comprising a drive shaft bracket fastening a drive shaft to a mounting component of the motor vehicle. The drive shaft bracket is fastened to the mounting component of the motor vehicle by a fastening portion. The drive shaft bracket, in the event of a front force on the drive shaft, is supported by a contact portion of the bracket via a contact point on a supporting component of the motor vehicle, which causes a rotation of the drive shaft bracket around the contact point. The rotation causes a joint between the fastening portion and the mounting component to be released.

19 Claims, 2 Drawing Sheets

MOUNTING UNIT COMPRISING DRIVE SHAFT AND DRIVE SHAFT HOLDER AS WELL AS MOTOR VEHICLE COMPRISING MOUNTING UNIT

CROSS REFERENCE TO RELATED APPLICATIONS

This application claims priority to German Patent Application Number 102016200741.6 filed on Jan. 20, 2016, the entire contents of which are incorporated herein by reference.

BACKGROUND OF THE INVENTION

The invention relates to a mounting unit for a drive shaft of a motor vehicle and a combination of a motor vehicle including the mounting unit. In this case, the mounting unit comprises a drive shaft holder, also referred to as a drive shaft bracket, for fastening at least one drive shaft to a mounting component, such as the engine block of the motor vehicle.

In order to increase the occupant safety in passenger motor vehicles, in particular, in the case of frontal impacts, various measures are known in which components in a front region of a vehicle are collapsed when predefined impact forces are exceeded, so as to permit a controlled deformation of parts in the front region of the vehicle. Thus, the forces from the impact are not transferred into the interior of the vehicle and deformation of the interior of the vehicle is minimized.

In one case it has been suggested that the components of a drive shaft should be collapsed in the axial direction in a collision. For example, drive joints which comprise an inner hub and an outer hub are disclosed in U.S. Pat. No. 8,157,658 B2. When a specific axial force on a drive joint is exceeded, the outer hub breaks open such that a crack is produced in the outer hub. The crack begins at one location and extends at least approximately in the radial direction. The crack permits the inner hub to be disengaged from the outer hub.

GB 2 358 902 A proposes a drive shaft which is collapsible in an axial direction and which is formed in one piece. The drive shaft has a uniform normal diameter but also has at least one compression zone formed by locally altering the diameter of the drive shaft. This compression zone has three different regions. In a first compression introduction region, the diameter of the drive shaft is slightly enlarged so that a local outwardly bulged portion is produced. A further, second region is joined to the first region. The diameter in the second region is also larger than the normal diameter of the drive shaft but smaller than the diameter in the compression introduction region. The diameter is further reduced from this second region to the normal diameter, forming a third region with a conical shape. U.S. 2003/0079327 A1 also discloses a collapsible drive shaft and, more particularly, discloses a method for producing such a drive shaft. JP 2002-002527 A also proposes a compressible component in the region of a drive shaft.

WO 2011/101952 A1 proposes a solution in which a drive shaft is deformed in a controlled manner in the event of a side impact, such that the drive shaft does not come into contact with other components of the vehicle. In this manner, the drive shaft does not damage the passenger compartment. To this end, a deformation guidance element is provided. In the event of an impact, the deformation guidance element forces the drive shaft in a specific direction. This preferably produces a downward deformation in the direction of the ground.

Drivetrains and engines of motor vehicles are becoming larger in size since they have to accommodate an increasing number of additional components, such as exhaust gas treatment devices, air-conditioning compressors, electric generators, etc., to fulfill new requirements. As a result, the number and size of non-deformable parts in the front region of the vehicle is increasing. Thus, the front of the vehicle has to be lengthened in order to maintain consistent safety performance as the additional components are added. This is often not desirable, however, for design reasons or due to other preset requirements for the vehicle.

Moreover, different types of drive shafts are used. For example, a front wheel drive vehicle drivetrain could include particular drive shafts such as an intermediate shaft, usually referred to as a link shaft, and equal length drive shafts, usually referred to as half shafts. Alternatively, the front wheel drivetrain drive could include two shafts without an intermediate shaft, in which case there would be two shafts of unequal length. This situation results in different drive units with different surrounding components, which has an affect on safety-relevant properties. The different systems result in an increase in the complexity, development effort and costs when designing ways to provide occupant safety in the event of a collision.

Regardless of the prior art described above, increasing the occupant safety in motor vehicles with increasingly large drivetrains is an area, which leaves further room for improvement. In particular, the pedal board, also referred to as a toeboard, being pressed in or deformed by components of the drivetrain in the event of a collision, represents an area where further improvements would be advantageous.

The object of the invention, therefore, is to provide a system in a motor vehicle by which the occupant safety in the event of a collision, in particular in the region of the toeboard, may be increased and to provide a system that functions independent of the type of drivetrain.

SUMMARY OF THE INVENTION

It should be mentioned that the features and measures set forth individually in the following description disclose further embodiments of the invention.

The present invention is directed to a mounting unit for a drive shaft of a motor vehicle. In this case, the mounting unit comprises a drive shaft bracket for fastening the drive shaft to a mounting component, such as the engine of the motor vehicle. The drive shaft bracket is designed as a releasable component that is destroyed in a controlled manner in the event of a collision to prevent the drive shaft from entering the passenger compartment of the motor vehicle.

The mounting unit, according to the invention, is configured as part of a motor vehicle and in this case may comprise a plurality of components. The mounting unit has at least one drive shaft and a drive shaft bracket, the drive shaft being suspended by the drive shaft bracket from a mounting component of the motor vehicle. The mounting unit thus also includes the respective mounting part of the motor vehicle supporting the drive shaft bracket. According to the invention, the drive shaft bracket includes a fastening portion, which is preferably a flange designed to accommodate mounting bolts. The drive shaft bracket is connected to the mounting component by a fastening, also referred to as a joint, formed between the fastening portion and the mounting component of the motor vehicle. The joint is preferably secured by bolts. The drive shaft bracket further includes a contact portion. In the event of a collision, a contact point on a supporting component of the motor vehicle engages the drive shaft bracket at the contact portion. The combination of the front force pushing a lower region of the bracket and the supporting component providing a counter force at the contact point applies a torque to the drive shaft bracket. As a result, a rotation of the drive shaft bracket around this contact point occurs and the joint or fastening between the fastening portion and the mounting component is thereby released. In the case of the joint being formed of bolts the bolts are destroyed as the mounting component is released.

Thus, in the normal installed state, the drive shaft bracket touches other components of the motor vehicle at at least one support point. A support point is produced in the fastening portion of the drive shaft bracket, between the fastening portion and a mounting component of the motor vehicle. Therefore, the actual support of the drive shaft and its connection to the motor vehicle is implemented via this fastening portion. A contact point is produced between the drive shaft bracket and a supporting component of the motor vehicle. This contact between the drive shaft bracket and a supporting component of the motor vehicle may already exist in the installed state and in normal operation of the motor vehicle. Alternatively, the contact is produced only when the front force acts on the drive shaft, the front force moving the drive shaft in the direction of the supporting component of the motor vehicle, so that the contact portion of the drive shaft bracket comes into contact with the supporting component.

When the front force on the mounting unit of the drive shaft bracket reaches a predetermined amount of force, the joint between the drive shaft bracket and the mounting component is thereby released in a controlled manner. The release of the drive shaft bracket, therefore, is not affected by any front forces on the drive axle caused by normal driving that are below a defined minimum force level, but the mounting unit is designed such that the release occurs only at or above the defined minimum force, which typically occurs in the event of a collision of the vehicle.

In the context of the invention, a front force represents a force, which in the event of a collision, substantially acts from the front face of the motor vehicle and onto the mounting unit including the drive shaft. The force in this case does not have to act exactly parallel to the longitudinal axis of the motor vehicle but within the meaning of the invention forces acting obliquely from the front of the motor vehicle also represent front forces which may affect a release of the drive shaft bracket.

In response to the front force which acts on the drive shaft, the drive shaft bracket rotates around the contact point between its contact portion and the selected supporting component, such that a pulling force is produced in the fastening portion which leads to a release of the fastening portion from the selected mounting component. The drive shaft bracket is thus not designed, as in the conventional manner, as a fixed connection that is not releasable and compressible in a typical collision. The drive shaft bracket is instead designed as a releasable component which is destroyed in a controlled manner in the event a large enough force is applied to the drive shaft. This represents a completely new approach for increasing occupant safety since before now the controlled release of a drive shaft bracket had not been considered.

In this manner, a front force is not transmitted via the drive shaft into the interior of the motor vehicle where, in particular, it could significantly deform the toeboard, i.e., the front wall of the passenger compartment. In this case, the release of the drive shaft also permits, in particular, an advantageous telescoping of the parts of a steering device located in front of the drive shaft. The mounting unit formed according to the invention, reduces the penetration of vehicle parts into the toeboard by up to 2 cm.

In a preferred embodiment of the invention, the drive shaft bracket is attached by its fastening portion to the engine block of the motor vehicle. The drive shaft bracket may also be fastened to an engine housing. This connection may, for example, include one or more bolts. The supporting component, on which the drive shaft bracket is supported in the event of a collision, may also be part of the engine housing or an engine block.

In the installed state of the mounting unit, the fastening portion is preferably located above the contact portion. The drive shaft then hangs below the fastening portion, wherein parts of the drive shaft are also located below the contact portion. If a front force presses the drive shaft in the direction of the toeboard, the drive shaft bracket is configured such that this force is applied below the contact portion of the drive shaft bracket. As a result, by the rotation of the drive shaft bracket around its contact point with the supporting component, a lever force is produced which is great enough to release the drive shaft bracket from the mounting component at the fastening portion. At this point it should be noted that the terms above and below are stated with reference to the normal operating position of the motor vehicle.

In one embodiment of the invention, the drive shaft bracket encompasses the drive shaft, wherein the fastening portion in the upper region and the contact portion in a central region of the drive shaft bracket are shaped, for example, in an annular manner. If the drive shaft is then pressed in the lower sector of the drive shaft bracket and in the direction of the toeboard, the aforementioned lever action is produced.

The contact portion of the drive shaft bracket may be suitably configured such that this lever action may be affected. For example, the contact portion may be formed by a surface of the drive shaft bracket extending vertically when the mounting unit is in the installed state. However, the contact portion may also be a type of depression engaging a corresponding bulged portion of the supporting component or vice-versa. The fastening portion may also have a straight surface which bears against the mounting part of the vehicle.

The drive shaft may, in particular, be a drive shaft with an intermediate shaft, i.e. the drive shaft includes two outer drive shaft portions of equal length and has an intermediate shaft located therebetween. The mounting unit according to the invention may thus comprise the drive shaft bracket for the intermediate shaft. The mounting unit, according to the invention, is used as a safety measure on this intermediate shaft. However, the mounting unit may also minimize the complexity of safety developments with the same engines and unequal length drive shafts. For example, in a powertrain with unequal length drive shafts, the mounting unit is preferably used to support the longer of the unequal length drive shaft. Adjustments are made in the case of footwell intrusions with unequal length drive shafts by simplifying the interaction with surrounding load path-forming components.

Moreover, a motor vehicle which has a mounting unit according to one or more of the disclosed embodiments is encompassed by the invention. In particular, in a preferred embodiment, the invention relates to a motor vehicle with a front-wheel drive, in which a drive shaft is located in the front region in front of the toeboard.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENTS

Figure 1:
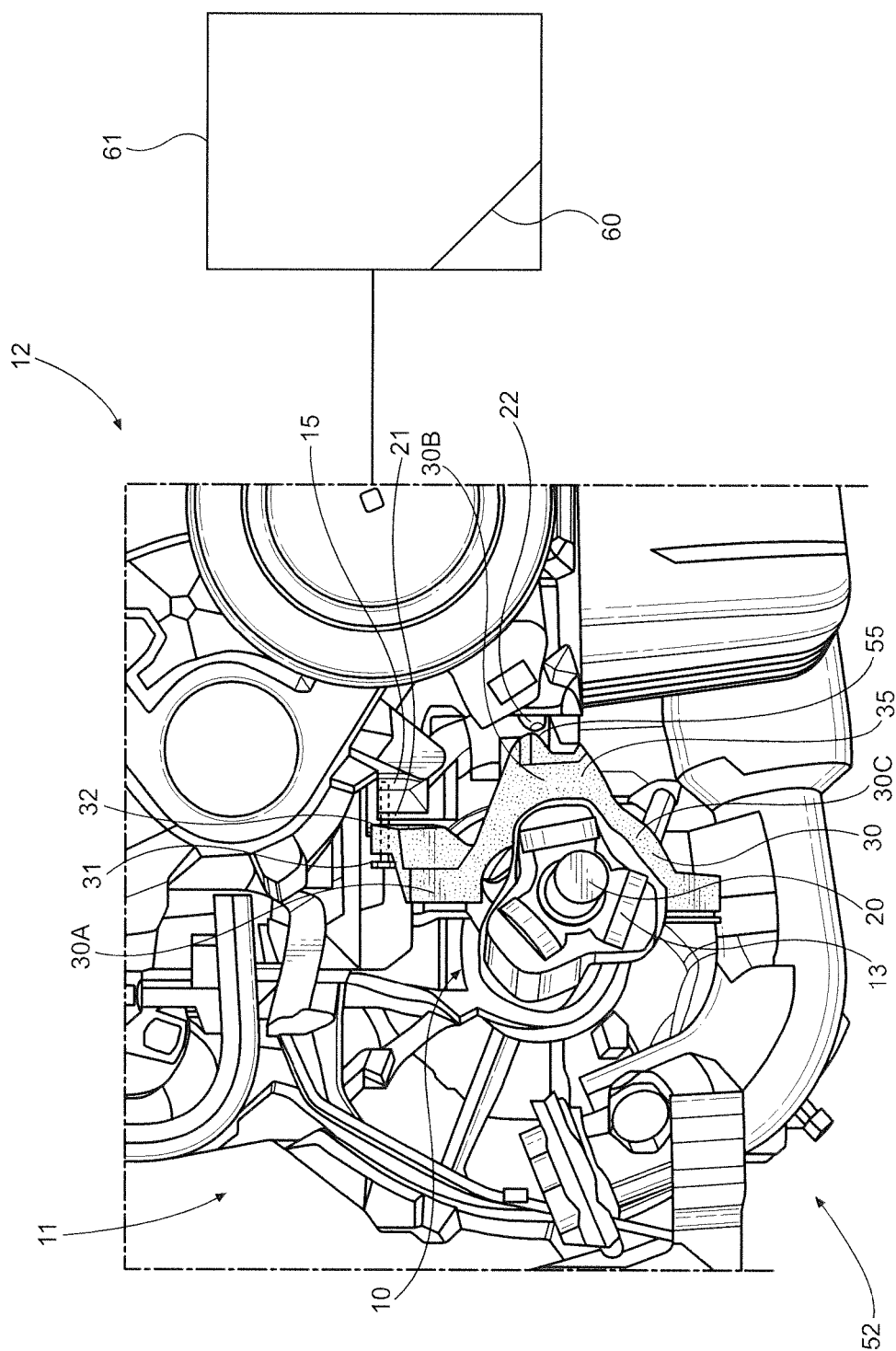
FIG. 1 shows an embodiment of a mounting unit according to the invention in an installed state.

With initial reference to FIG. 1 there is shown an embodiment of a mounting unit 10 according to the invention in the installed state. The mounting unit 10 shown in FIG. 1 in a front region 11 of a front wheel driven motor vehicle 12 comprises an engine block 15, at least one drive shaft 20 with a tripod joint 13 for the transmission of force between the drive shaft 20 and an axle gear, not shown. The drive shaft 20 is preferably a front wheel drive shaft for driving the front wheels of the vehicle and the rear wheels may or may not be driven. The drive shaft 20 is fastened via a drive shaft holder 30, also referred to as a drive shaft bracket, to a mounting component 21, which is formed from part of the engine block 15, wherein in FIG. 1 only a right-hand half of the drive shaft bracket 30 is shown. The left-hand half is not shown, wherein both halves form an annular holder having an upper region 30a, a center region 30b and a lower region 30c. The half which is not shown is fastened in the upper 30a and lower regions 30c to the right-hand holder half which, for example, may be implemented by a screw connection.

The drive shaft bracket 30 is attached in a fastening portion 31 to a mounting component 21 of the vehicle 12. The mounting component 21 is, for example, part of the engine block 15. This fastening or joint 32 may be implemented via a plurality of bolts 33, only one of which is shown. For example, three bolts have proved advantageous. The drive shaft bracket 30 also bears with a contact portion 35 against a supporting component 22 of the vehicle 12. The supporting component 22 may also be another part of the engine block 15.

Figure 2:
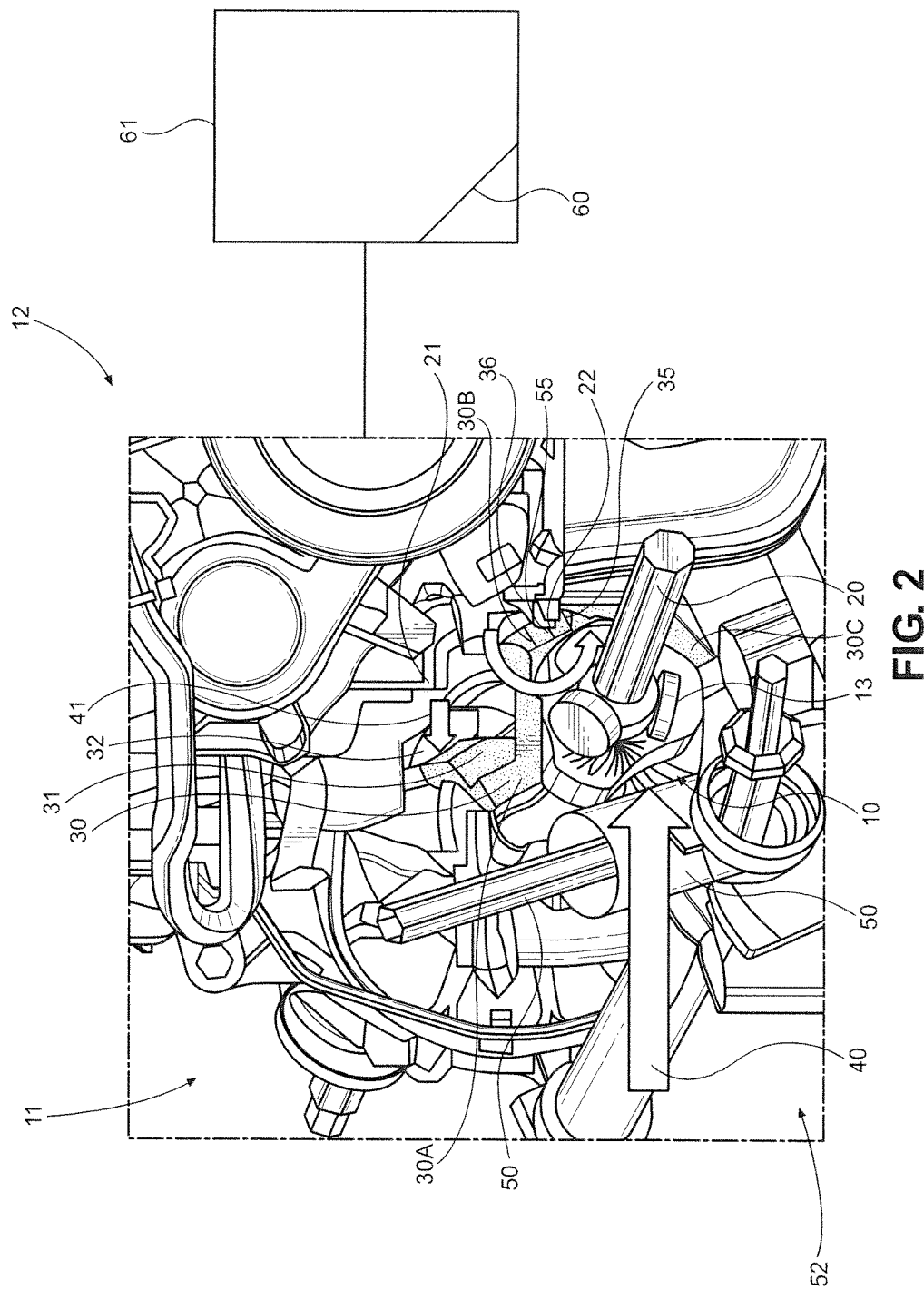
FIG. 2 shows a mounting unit according to FIG. 1 in the case of a front force in the event of a collision.

FIG. 2 shows the components of the mounting unit 10 in the event of a collision, wherein a prevailing front force 40 is identified by an arrow. This force 40 acts in the direction of the drive shaft 20. In this case, for example a steering device 50 in the lower region 52 is pushed in the direction of the drive shaft 20, whereby a lever force 41, acts at the contact point 55, on the supporting component 22. The supporting component 22 thus acts as a fulcrum at 36. The resulting rotation of the drive shaft bracket 30 is identified in FIG. 2 by an arrow 42. By means of this lever force 41, the fastening portion 31 is released from the mounting component 21, which is identified by an arrow.

The lever force 41 thus produces a pulling action, the fastening portion 31 being pulled by the action away from the mounting component 21. The fastening or joint 32 in this region is thus designed such that it is released with a defined pulling force caused when force 40 reaches or exceeds a predetermined amount of force. As a result, the entire drive train is not pushed as a compact unit in the direction of the toeboard 60 of passenger compartment 61 but, by the release of the drive shaft 20 from the vehicle 12, parts may be telescoped and thus nested together, such that the penetration of parts into the toeboard 60 will be reduced or avoided.

Although described with reference to preferred embodiments of the invention, it should be readily understood that various changes and/or modifications can be made to the invention without departing from the spirit thereof. In general, the invention is only intended to be limited by the scope of the following claims.

I claim:

1. A mounting unit comprising:
   a mounting component;
   a supporting component including a contact point;
   a drive shaft of a front wheel drive motor vehicle;
   a drive shaft bracket including a contact portion and a fastening portion connected to the mounting component with a joint, wherein the bracket is configured to support the drive shaft so that, when subjected to a predetermined amount of force, the bracket rotates around the contact point and releases the joint.

2. The mounting unit as claimed in claim 1, wherein the mounting component is a part of an engine block of the motor vehicle and the drive shaft bracket is fastened by the fastening portion to the engine block.

3. The mounting unit as claimed in claim 2, wherein the supporting component is formed from another part of the engine block.

4. The mounting unit as claimed in claim 1, wherein the fastening portion is located above the contact portion.

5. The mounting unit as claimed in claim 4, wherein the drive shaft bracket encompasses the drive shaft in an annular manner and includes an upper region, a center region, and a lower region and, wherein the fastening portion is formed in the upper region of the drive shaft bracket and the contact portion is formed in the center region of the drive shaft bracket.

6. The mounting unit as claimed in claim 1, wherein the contact portion is formed by a surface of the drive shaft bracket extending vertically.

7. The mounting unit as claimed in claim 1, wherein the drive shaft bracket is connected by bolts to the mounting component and releasing the joint destroys the bolts.

8. The mounting unit as claimed in claim 1, wherein the drive shaft includes an intermediate shaft and the drive shaft bracket supports the drive shaft at the intermediate shaft.

9. The mounting unit as claimed in claim 1, wherein the contact point of the supporting component is a fulcrum.

10. The mounting unit as claimed in claim 9, wherein the bracket is configured to support the drive shaft so that, in the event of a collision, when the mounting unit is subjected to a predetermined amount force, the contact portion of the drive shaft bracket will engage the fulcrum causing the drive shaft bracket to act as a lever and develop a lever force that releases the joint formed between the contact portion and the mounting component and causes the drive shaft bracket to separate from the mounting component.

11. A motor vehicle, comprising:
    a passenger compartment with a toeboard; and
    a mounting unit including:
       a mounting component located in the motor vehicle;
       a supporting component located in the motor vehicle and including a contact point;
       a drive shaft;
       a drive shaft bracket including a contact portion and a fastening portion connected to the mounting component with a joint when in an installed state, wherein the bracket is configured to support the drive shaft so that, in the event of a collision, when the mounting unit is subjected to a predetermined amount of force, the contact portion of the drive shaft bracket engages the contact point of the supporting component and the drive shaft bracket rotates around the contact point and releases the joint formed between the contact portion and the mounting component, causing the drive shaft bracket to separate from the mounting component whereby deformation of the toeboard in a collision is reduced.

12. The vehicle as claimed in claim 11, further comprising an engine block and wherein the mounting component is a part of the engine block of the motor vehicle and the drive shaft bracket is fastened by the fastening portion to the engine block.

13. The vehicle as claimed in claim 12, wherein the supporting component is formed from another part of the engine block.

14. The vehicle as claimed in claim 11, wherein, in the installed state, the fastening portion is located above the contact portion.

15. The vehicle as claimed in claim 14, wherein the drive shaft bracket encompasses the drive shaft in an annular manner and includes an upper region, a center region, and a lower region and, wherein the fastening portion is formed in the upper region of the drive shaft bracket and the contact portion is formed in the center region of the drive shaft bracket.

16. The vehicle as claimed in claim 11, wherein the contact point of the supporting component is a fulcrum.

17. The vehicle as claimed in claim 16, wherein the bracket is configured to support the drive shaft so that, in the event of a collision, when the mounting unit is subjected to a predetermined amount of force, the contact portion of the drive shaft bracket will engage the fulcrum causing the drive shaft bracket to act as a lever and develop a lever force that releases the joint formed between the contact portion.

18. A method of reducing deformation of a toeboard of a passenger compartment of a front wheel drive motor vehicle, including a drive shaft supported by a drive shaft bracket having a fastening portion connected to a mounting component of a mounting unit through a joint and a contact portion, the method comprising:

when a predetermined amount of force is applied to the mounting unit, causing a contact portion of the drive shaft bracket to engage a contact point of a supporting component and rotation of the drive shaft bracket around the contact point thus releasing the joint formed between the fastening portion and the mounting component and separating the drive shaft bracket from the mounting component.

19. The method as claimed in claim 18, wherein the contact point of the supporting component is a fulcrum and further comprising engaging the contact portion of the drive shaft bracket with the fulcrum, causing the drive shaft bracket to act as a lever and developing a lever force that releases the joint formed between the contact portion and the mounting component.

* * * * *